L. A. Aspinwall.

Corn Husker.

No. 4,174. Reissued Nov. 8, 1870.

Witnesses

J. C. Bruckt

Oscar C. Fox

Inventor

L. Augt. Aspin

N. PETERS, PHOTO-LITHOGRAPHER, WASHINGTON, D. C.

UNITED STATES PATENT OFFICE.

L. AUGUSTUS ASPINWALL, OF ALBANY, NEW YORK.

IMPROVEMENT IN MACHINES FOR HUSKING CORN.

Specification forming part of Letters Patent No. 101,809, dated April 12, 1870; reissued August 16, 1870, No. 4,099; reissued November 8, 1870, No. 4,174.

*To all whom it may concern:*

Be it known that I, L. AUGS. ASPINWALL, of the city and county of Albany and State of New York, have invented certain new and useful Improvements in Corn-Huskers; and I declare the following specification, with the drawings forming a part thereof, to be a full and complete description of my invention.

Figure 1:
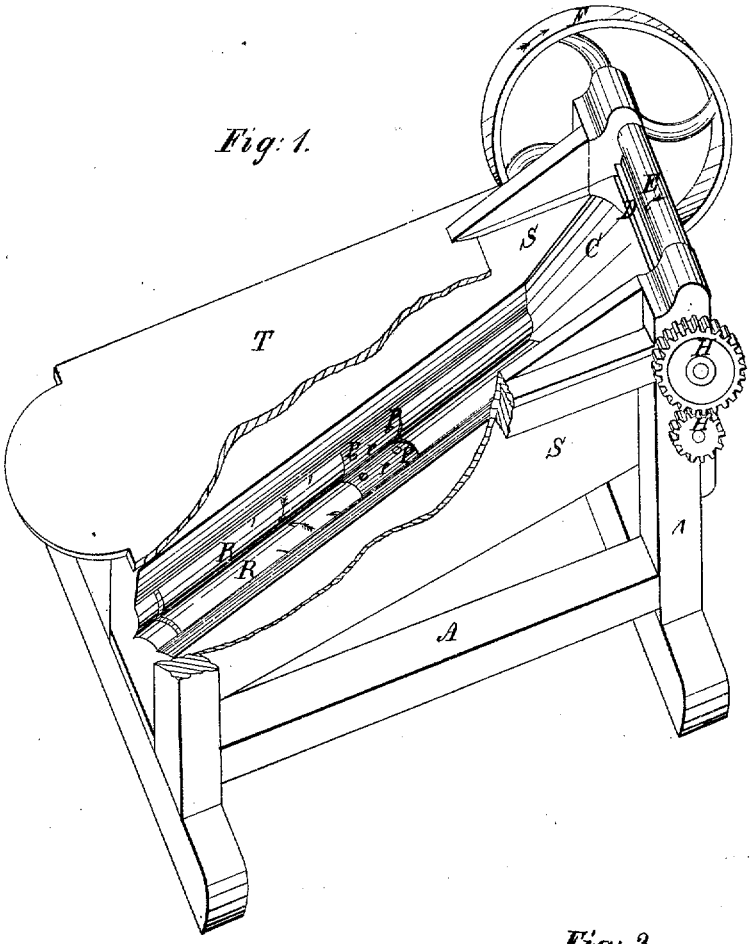
Figure 2:
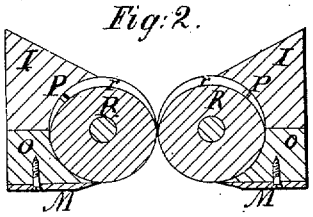
Figure 3:
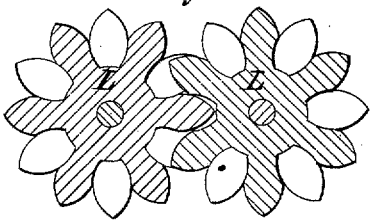
Figure 4:
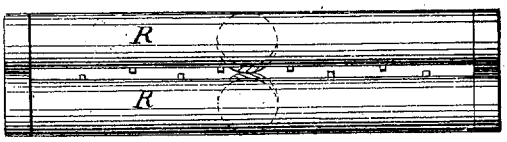

Figure 1 represents a perspective view of the machine, with a portion of the top and side broken away. Fig. 2 represents a cross-section of the husking-rolls and cutters. Fig. 3 represents a section of the gear-wheels used upon the rolls. Fig. 4 represents a plan view of the rolls modified as hereinafter described.

Similar letters denote similar parts of the apparatus.

A A A is the frame of the machine.

T is the top or table.

F is the band-wheel upon the shaft, on which is the picker-roller D, having its surface grooved angular. Above this, and in combination with it, is the plain roller E. These serve to pick or remove the ears of corn from the stalks. Upon the same with the fly-wheel is the gear-wheel H, connecting with the pinion H, which gives motion to the husking-rolls R R by means of bevel-gears underneath.) Not shown in the drawings.) The husking-rollers R R are placed upon an incline, as in most machines.

B B are boxes in which the rolls revolve.

C is the inclined plane upon which the ears are conducted to the rolls. Beneath this is another pair of boxes, which support the upper ends of the rolls; also, a pair of double gears, which connect the rolls. (Not shown, owing to their small size, but may be seen in Fig. 3, L L).

S S are the sides.

I I are the beveled sides to insure the keeping of the ears lengthwise of the rolls.

Fig. 2 is a section of the rolls R R and the cutters M M, for the purpose of keeping the rolls free from husks.

The method of husking corn by means of rolls, as well as picking it from the stalks, is no new thing. Rubber rolls of various constructions have been used, also rubber and iron combined, but they lack durability. Iron rolls provided with teeth upon the surface have been used, but they shell the corn. Grooved rolls become filled with gum, and like plain rolls fail to remove the husks.

It will be seen that the rolls R R are neither smooth, grooved, nor provided with teeth upon the surface, but are made with depressed portions *r r*, running lengthwise the rolls, and quartering, in order that the strain may be equalized. When the strain is not regarded the depressions may extend the entire length of the rolls. It is not necessary that these depressions be made eccentric, but may be flat or varied in any way, so as not to form a groove that will become filled with gum. The eccentric form is merely a matter of convenience in turning them in a lathe in their manufacture. These rolls when in rotation will present between them alternately an open space and a closed contact of surfaces. The open space caused by the depression is for the purpose of allowing the ear of corn to drop down into it, and in closing to suddenly impinge upon the covering or husk to detach a portion of it and carry it downward between the cylindrical surfaces as they roll together, and thus draw it off. These depressed rolls are provided with teeth P P, set in one side of the depression, so as not to impinge upon the ear until the cylindrical surfaces pass their points of contact and let go their hold of the husk, thus preventing the shelling of the corn. I prefer rollers of small diameter, with only one depression on the periphery, but they may be made larger and have more; but as long as they present the alternation of open spaces between them and the rolling contact of cylindrical surfaces they will work in the same manner. The depressions may, if made larger, be all in one roll, and the other roll be made cylindrical, yet operate in the same manner.

Husking-rolls provided with teeth are liable to become wound around with husks, and cannot be removed with scrapers. It is therefore necessary to use cutters, as seen in Fig. 2, M M.

The gear-wheels used upon the husking-rolls of all machines must necessarily be small; consequently are subject to a heavy strain and are liable to break quite often, To avoid this the gears L L, Fig. 3, are used, which are double, and may be tripled or quadrupled, having teeth opposite the spaces in each, which gives a constant bearing upon the pitch-line and insures a stronger wheel from the fact of there being double the number of teeth. Although this is not new in itself, the improvement consists in the application to husking-rolls.

The operation of the machine is thus: The power being applied to the wheel F, gives motion to the picker-roller D, and by means of the gear-wheel and pinion H motion is communicated to the rolls R R, all in the direction of the darts. The stalks then being placed upon the table T, are fed butts first between D and E, where they are carried along and the ears pinched off, dropping them upon the rolls R R, where the husks are removed and the ears delivered at B B.

What I claim as my invention is—

1. The husking-rolls R R, when provided (one or both) with depressions *r*, formed substantially as shown, and for the purpose set forth.

2. In combination with the rolls R R, constructed substantially as described, the double gears L L, as and for the purpose specfied and set forth.

3. In combination with the depressions *r*, of the rolls R R, the teeth P, as and for the purpose described.

4. The combination and arrangement of the knives M M with the rolls R R, constructed substantially as shown, and for the purpose set forth.

5. The employment, in a machine for husking corn, of husking-rolls working together in pairs, provided with alternate depressions on their peripheries, formed substantially as shown in cross-section, Fig. 2 of the drawings, and arranged to operate substantially as described, and for the purpose set forth.

L. AUGS. ASPINWALL.

Witnesses:

DAVID A. THOMPSON,
JOHN R. SHEPARD.